United States Patent Office 3,376,268
Patented Apr. 2, 1968

3,376,268
AMIDE-HETEROCYCLIC POLYMERS
Jack Preston, Raleigh, N.C., assignor to Monsanto Company, a corporation of Delaware
No Drawing. Filed Feb. 26, 1964, Ser. No. 347,392
18 Claims. (Cl. 260—78)

This invention relates to new temperature resistant and condensation polymers and more particularly to polymers containing amide and heterocycle linkages in the polymer chain.

Synthetic linear condensation polymers such as polyamides in the form of fibers, films and shaped articles have found wide application in textile and other industrial end uses requiring high tensile strength, abrasion resistance and resistance to thermal and other degradative conditions. Subsequent searching for polymers of improved thermal resistance has produced various heterocycle polymers such as polyoxadiazoles, polybenzimidazoles, and polyimides. Such heterocycle polymers have certain characteristics, including heat resistance and resistance to acids and other degradative conditions, which are superior to those of polyamides in general. A linear condensation polymer which would combine the desirable qualities and characteristics of both polyamides and heterocycle polymers would be advantageous.

It is an object of this invention to provide new compositions of matter and a process for their preparation.

Another object of this invention is the provision of novel amide-heterocycle polymers which are characterized by the fact that they have amide and heterocyclic linkages which appear in a perfectly regular sequence along the polymer chain, each linkage being separated by an aromatic radical, the polymers further being characterized by the fact that there is at least one point in each repeating unit of the polymer through which a plane of symmetry can be drawn and by the fact that the heterocycles themselves are symmetrical.

It is a further object to provide polymers which are unusually thermally stable.

An additional object of the invention is the provision of fibers, filaments, films and other shaped articles prepared from the amide-heterocycle polymers of this invention.

Other objects and advantages will become apparent from the description of the invention which follows hereinafter.

This invention involves the provision and preparation of "symmetrical" amide-heterocycle polymers having the formula

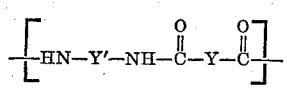

wherein Y and Y' are selected from Ar and Ar-X-Ar where X represents a symmetrical heterocyclic linkage which contains from one to three hetero elements such as N, S, P, As, O and Se, and which must be the same in both Y and Y', and Ar is an aromatic divalent radical which may save a single, multiple, or fused structure.

The heterocyclic linkages are exemplified by

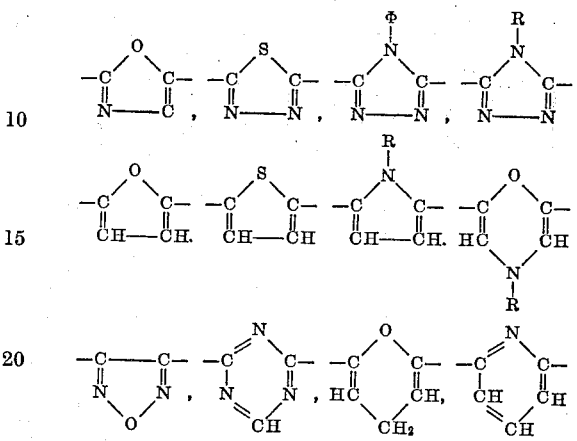

and the like, where R=H or lower alkyl.

The divalent aromatic radicals may be, for example,

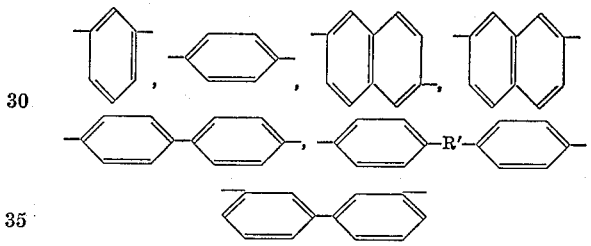

and similar aromatic radicals wherein R' is —O—, —S—, —SO$_2$—.

The use of the term "symmetrical" herein is intended to relate to a characteristic of the polymers of this invention which may be described by the fact that there is at least one point in each repeating unit of the polymers through which a plane of symmetry can be drawn. For example, repeating units may be shown as follows

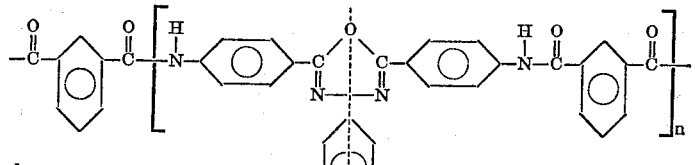

and

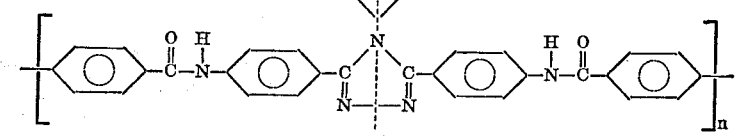

wherein a plane of symmetry as indicated by the dotted line shows that the repeating units consist of two halves which are mirror images of each other.

As examples of amide-heterocycle polymers having the above general formula there may be mentioned:

(I)

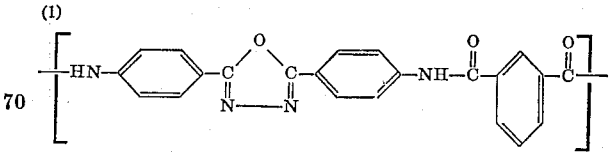

(2) 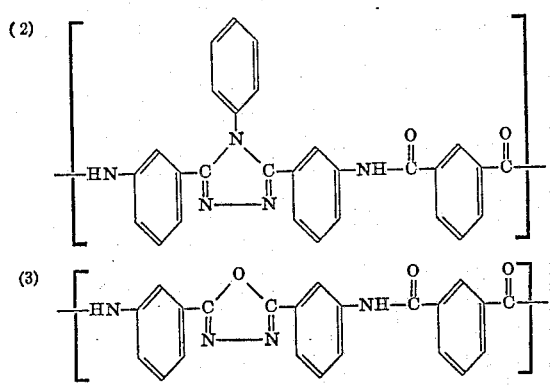
(3) 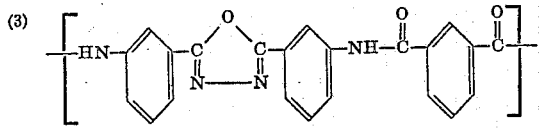
(4) 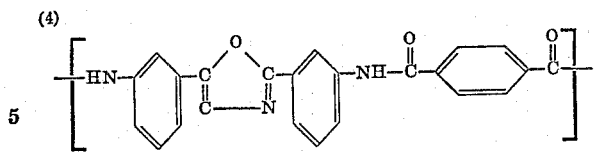
(5) 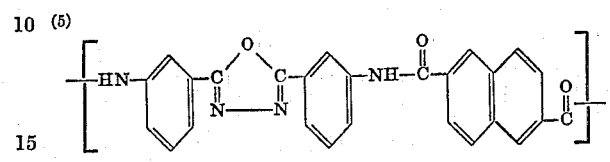
(6) 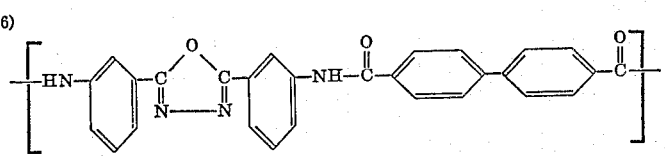
(7) 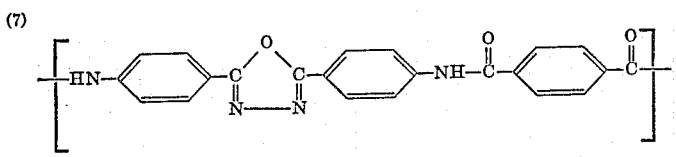
(8) 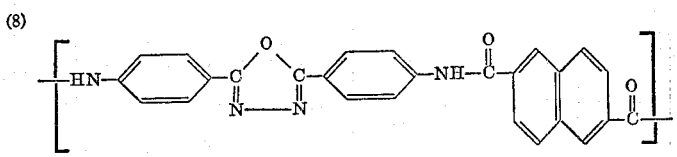
(9) 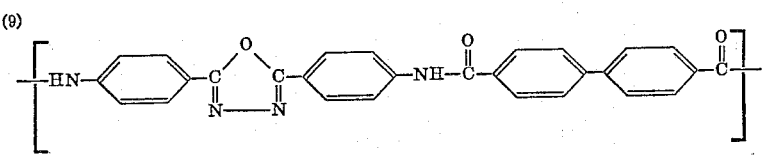
(10) 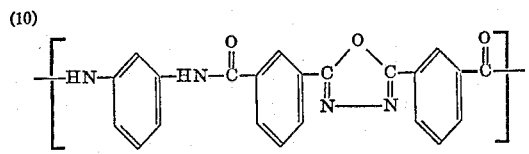
(11) 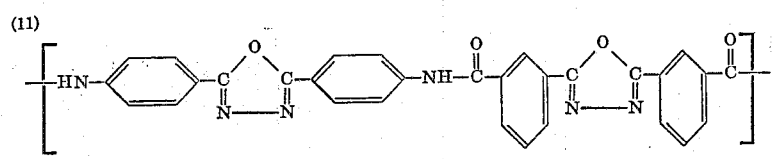
(12) 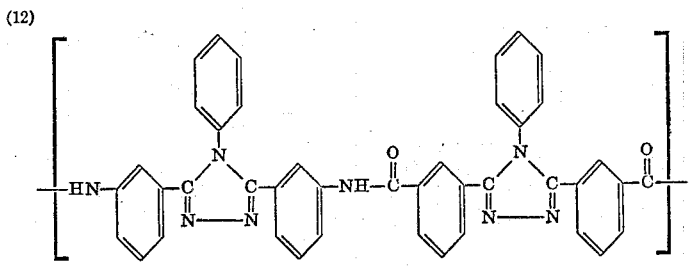

The polymers of this invention may be prepared by reacting together two monomers, each containing functional groups which react with the functional groups of the other to produce a polymer containing amide and one or more heterocyclic linkages in each repeating unit which appear in a perfectly regular sequence along the polymer chain. Thus, the polymers may be prepared via the reaction of an aromatic diacid chloride with an aromatic diamine containing a heterocyclic linkage or from the reaction of an aromatic diacid chloride containing a heterocyclic linkage with an aromatic diamine. An alternate route to the polymers of this invention employs the reaction of a monomer containing preformed amide linkages and functional groups which, when reacted with the functional groups of a second monomer, produce heterocyclic linkages. Both monomers may, as in the cases illustrated above, contain the same preformed heterocyclic linkages. The polymerization of the reactants is a condensation reaction which may be conveniently conducted by interfacial or solution polymerization methods, by heating of stoichiometric amounts of reactants and the like.

The following equations are exemplary of how the polymers of the invention can be prepared:

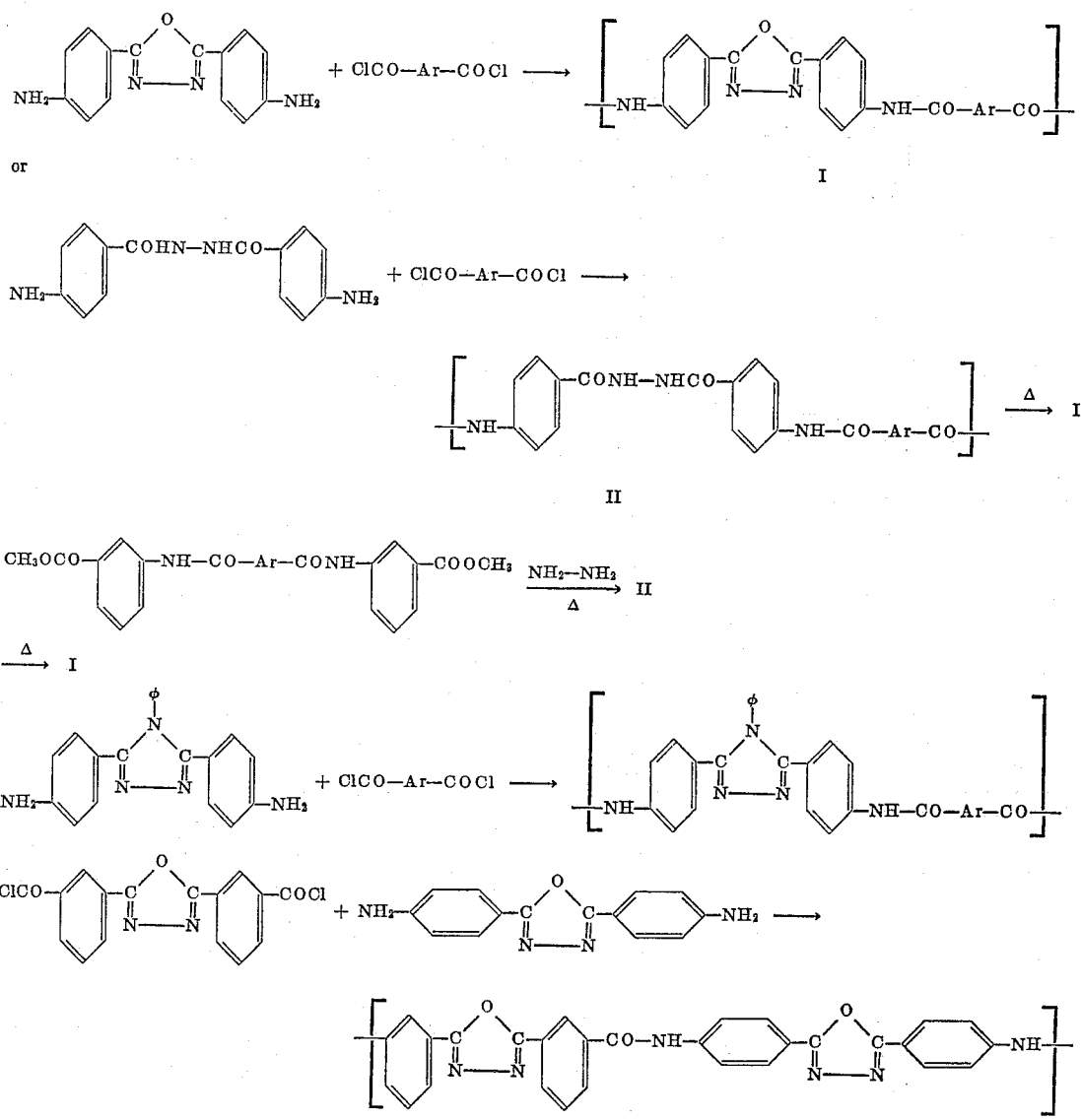

where Ar has the same significance as before. The polyamide-hydrazide II may find use as such or may alternatively be converted to a polyamide-oxadiazole I by heating, which causes the hydrazide unit to eliminate water and thus form an oxadiazole unit.

Of the several routes to the preparation of the polymers of this invention, the polymerization of an aromatic diamine containing a heterocyclic linkage may be cited. As examples of the diamines which may be used in the practice of this invention, the following are typical and illustrative:

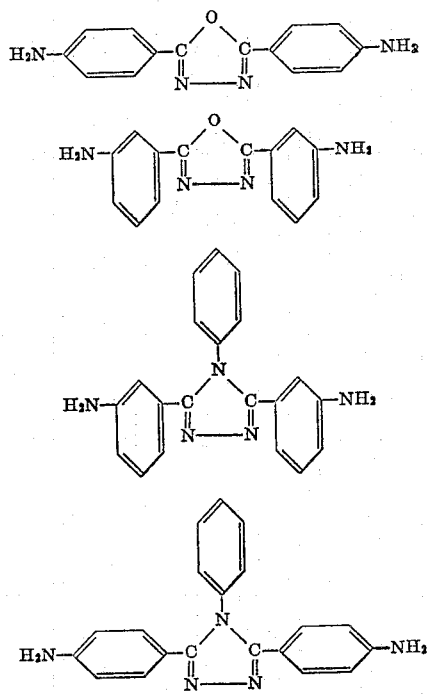

The method of preparation of the heterocyclic containing diamines of this invention, in general, is conveniently accomplished by the preparation of a dinitro intermediate which is then reduced to the diamino compound containing heterocyclic linkages. The heterocyclic linkage itself is formed prior to the time that the dinitro intermediate is reduced, and the reduction of the dinitro to the diamino compound does not involve the heterocyclic linkage itself.

The dinitro intermediate may be prepared by any of several well known methods. A 1,3,4-oxadiazole linkage may be formed from a hydrazide linkage which may be formed in solution or via a Schotten-Baumann reaction. The Schotten-Baumann or interfacial type reaction involves the use of a nitro-aromatic acid chloride either alone or in a suitable solvent which will dissolve the acid chloride and which will at the same time not adversely affect the other component which is dissolved or dispersed in water. Suitable solvents include chloroform, tetrahydrofuran, benzene, benzonitrile, acetophenone, acetonitrile, dimethylacetamide, and other solvents—tetrahydrofuran being preferred. The reaction mixture is then stirred rapidly until the reaction is completed and the dinitro compound is filtered from the reaction mixture. The choice of intermediate reactants will, of course, depend upon the type of heterocyclic linkage desired. For example, the reaction of m-nitrobenzoyl chloride plus hydrazine in a basic reaction media will produce a nitro-hydrazide intermediate which may then be converted by a dehydrating agent, such as phosphorousoxychloride, thionyl chloride, or acetic anhydride, to a dinitro intermediate compound containing a 1,3,4-oxadiazole linkage. The hydrazide intermediate may also be produced in a solvent, such as dimethylacetamide. The dinitro compound containing the oxadiazole linkage may then be reduced to the diamino compound.

It is also possible to prepare the dinitro hetero-containing intermediate in a one-step synthesis. For example, the reaction of N-phenyl-m-nitrobenzimide chloride and m-nitrobenzoyl hydrazide yields the dinitro intermediate containing a 1,3,4-triazole linkage directly.

Other heterocyclic linkages may be preformed readily in the compositions of this invention, e.g. 1,3,4-thiodiazole.

The reduction of the dinitro intermediate to the amine may be effected by use of catalytic reducing methods such as those involving the use of a palladium on charcoal catalyst typically employing 5 percent palladium on charcoal, a Parr hydrogenation unit or other unit. The reduction may also employ Raney nickel, cobalt and other similar heavy metal catalysts, these catalyst systems usually being effected in an alcohol or in solution in dimethylformamide or similar compounds. Reduction may also be accomplished using chemical reduction methods, such as stannous chloride and hydrochloric acid, iron and sulfuric acid, polysulfide solutions and the like.

Suitable dicarboxylic acids or diacid derivatives which may be used in the practice of the invention include all diacid compounds where the carbonyl radicals are joined by aromatic or heterocyclic aromatic linkages, for example, aromatic diacid halides, such as isophthaloyl halide and substituted isophthaloyl chlorides such as alkyl, aryl, alkoxy, nitro and other similar isophthaloyl chlorides and isophthaloyl bromides. Examples of such compounds include 4,6-dimethyl-5-propyl isophthaloyl chloride, 2,5-dimethyl isophthaloyl chloride, 2,5-dimethoxy isophthaloyl chloride, 4,6-dimethoxy isophthaloyl chloride, 2,5-diethoxy isophthaloyl chloride, 5-propoxy isophthaloyl chloride, 5-phenyl isophthaloyl chloride, 2-methyl-5-phenyl isophthaloyl chloride, 2,5-dinitro isophthaloyl chloride, 5-nitro isophthaloyl chloride and the like. Terephthaloyl chloride or terephthaloyl bromide may also be used and may be substituted in the manner described above for isophthaloyl chloride. Examples of terephthaloyl chlorides include 2,6-dimethyl terephthaloyl chloride, tetramethyl terephthaloyl chloride, 2-methoxy terephthaloyl chloride, 2-nitro terephthaloyl chloride and the like.

These diacid monomers may be prepared by any of the well known prior art methods used to prepare aromatic diacid compounds. For example, oxidation of xylenes.

The polymers of the invention may be obtained by any of the well known condensation polymerization techniques such as solid state, melt, interfacial or solution polymerization techniques.

The solution polymerization method generally involves dissolving the diamine in a suitable solvent which is inert to the polymerization reaction. Among such solvents there may be mentioned dimethylacetamide, 1-methyl-2-pyrrolidone, 1,5-dimethyl-2-pyrrolidone and the like. These solvents are rendered more effective in many instances by mixing them with a small amount, up to 10 percent, of an alkali or alkaline earth salt such as lithium chloride, lithium bromide, magnesium bromide, magnesium chloride, beryllium chloride, or calcium chloride. The preferred solvent for solution polymerization is dimethylacetamide or dimethylacetamide containing a small amount of dissolved lithium chloride. The diamine solution is cooled to between 20° and −30° C. and the dicarbonyl monomer is added either as a solid or in a solution of one of the aforementioned solvents. The mixture is then stirred for a period of time until polymerization is substantially complete and high viscosity is attained. This highly viscouse solution may be spun per se, neutralized with caustic, or the polymer may be isolated by pouring the mixture in a non-solvent, washing and drying the polymer and then preparing the spinning solution.

The interfacial polymerization reaction is conducted by mixing water, an emulsifier and the diamine which may be in the form of its dihydrochloride. A proton acceptor is then added and the mixture is then stirred rapidly. During this rapid stirring a solution of the dicarbonyl monomer in an inert organic solvent is added, the mixture is stirred until polymerization is complete, the polymer is then isolated by filtration and is washed and dried. The dicarbonyl monomer solvent may be any convenient solvent such as cyclic non-aromatic oxygenated organic solvent such as a cyclic tetramethylene sulfone, 2,4-dimethyl cyclic tetramethylene sulfone, tetrahydrofuran, propylene oxide and cyclohexanone. Other suitable dicarbonyl monomer solvents include chlorinated hydrocarbons such as methylene chloride, chloroform and chlorobenzene, benzene, acetone, nitrobenzene, benzonitrile, acetophenone, acetonitrile, toluene and mixtures of the above solvents such as tetrahydrofuran and benzonitrile, tetrahydrofuran and acetophenone or benzene and acetone and the like.

The amounts of the various reactants which may be employed will, of course, vary according to the type of polymer desired. However, in most instances, substantially equimolar quantities or a slight excess of diamine to dicarbonyl may be used. For interfacial polymerization reactions, sufficient proton acceptor to keep the acidic by-products neutralized may be added, the exact amount easily determined by one skilled in the art.

Suitable emulsifying agents for interfacial polymerization include anionic and nonionic compounds such as sodium lauryl sulfate, nonyl phenoxy (ethyleneoxy) ethane, the sodium or potassium salt of any suitable condensed sulfonic acid and the like.

A proton acceptor as the term is employed herein indicates a compound which acts as an acid scavenger to neutralize HCl, formed during the reaction, and which aids to carry the reaction to completion. Suitable proton acceptors include sodium carbonate, magnesium carbonate, calcium carbonate, tertiary amines, such as triethyl amine, trimethyl amine, tripropyl amine, ethyl dimethyl amine, tributyl amine and similar compounds which react as desired.

The products of this invention are useful in a wide range of applications. In the form of fibers, filaments and films the polymers of this invention are thermally resistant as well as being resistant to acids and other types of chemical degradation. The invention is further illustrated by the following examples in which all parts and percents are by weight unless otherwise indicated. Heat resistant properties of the polymers of the invention were tested by differential thermal analysis (DTA) and thermogravimetric analysis (TGA). Glass transition temperatures ($T_g$), melting temperature ($T_m$), decomposition temperatures ($T_{dec.}$), and crystallization temperatures ($T_c$) were also recorded in some instances. Inherent viscosity values are determined at 30° C. in dimethylacetamide containing 5 percent dissolved lithium chloride or in concentrated sulfuric acid, using a concentration of 0.5 g. of polymer per 100 ml. of solvent. Fibers were characterized in general by having good strength retention above 300° C.

Example I

This example shows the preparation of one of the diamines which are used in the preparation of the polymers of the invention; a method for the preparation of similar diamines is disclosed in copending application Ser. No. 296,397 by Preston, now abandoned.

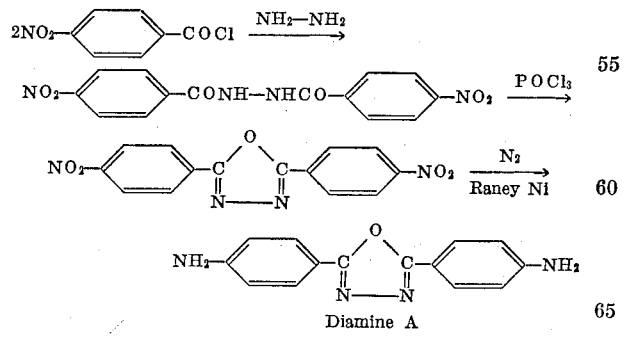

Diamine A

To a solution of 52 g. (0.4 mole) hydrazine sulfate and 170 g. sodium carbonate in 1500 ml. ice-water was added 150 g. (0.8 mole) p-nitrobenzoyl chloride in 250 ml. dry tetrahydrofuran. The mixture was stirred for 20 minutes, then heated to 70° C. and filtered. The dried crude product, M.P. 294–300° C., weighed 125 g.; recrystallization of the crude product from 1 liter of dimethylformamide (DMF) and 300 ml. water gave 104 g. of pure product M.P. 297–302° C.

The hydrazide intermediate above was converted to 2,5-bis(p-nitrophenyl)-1,3,4-oxadiazole by refluxing 102 g. of the above N,N'-bis(p-nitrobenzoyl) hydrazine with 550 ml. phosphorousoxychloride for twelve hours. The mixture was cooled, and the product filtered, washed and dried to yield 96 g. crude product, M.P. 308–316° C. A yield of 91.5 g. pure product, M.P. 311–316° C. was obtained upon recrystallizing the crude product from 4 liters DMF.

The dinitro intermediate above was reduced catalytically in dimethylacetamide (DMAc) using a Raney nickel catalyst. Thus, 60 g. of the dinitro material was shaken in a bomb with 300 ml. DMAc, 4 g. Raney nickel catalyst and hydrogen at an initial pressure of 3250 p.s.i. at 25° C. The system was then heated to 100° C. and repressured to 3400 p.s.i. The highest temperature reached was 112° C. and this temperature was held for four hours, followed by a drop in temperature to 105° C. at 2820 p.s.i. The system was cooled to 70° C., then left to sit overnight without shaking or further heating. The following day the pressure was 2150 p.s.i. at 20° C.

The diamine was isolated by pouring the filtered solution from the hydrogenation into 3500 ml. water at 30° C.; the diamine was filtered off and rewashed in 1 liter of hot water. The product was purified by dissolving it in 50 ml. concentrated hydrochloric acid and 3500 ml. water at the boil. Next, 2 g. activated charcoal was added and the solution was filtered, then neutralized with 2 N sodium hydroxide solution. The white diamine was filtered, washed with water and dried at 50° C. in a vacuum oven with a nitrogen bleed. Thus, 37 g. pure 2,5-bis(p-aminophenyl)-1,3,4-oxadiazole, M.P. 258–260° C., was obtained.

Example II.—Polyamides of 2,5-bis(p-aminophenyl)-1,3,4-oxadiazole (diamine A)

The polymers of this example have the following structures:

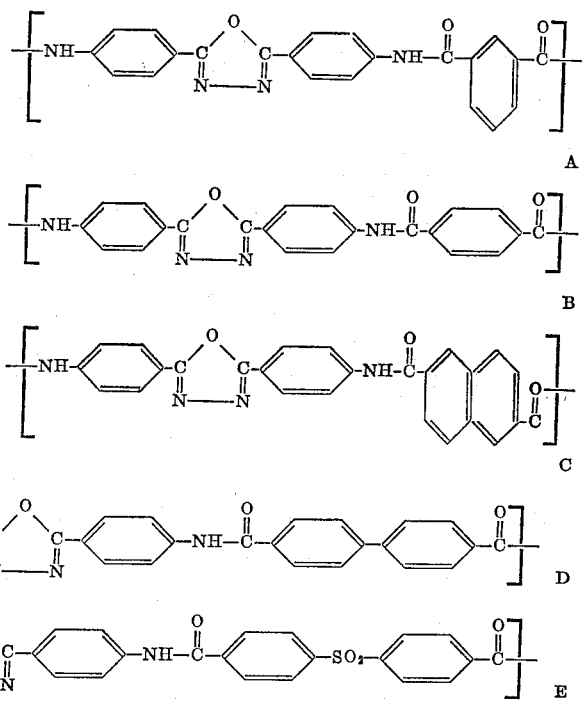

(A) *Isophthalamide.*—A 1.89 gm. portion (0.0075 mole) of diamine A, 0.5 gm. of lithium chloride, and 10 ml. of DMAc were mixed together and warmed to effect solution. The solution was cooled with an ice bath then 1.5 gms. (0.0075 mole) of isophthaloyl chloride was added. A viscous mass was obtained after two hours of stirring at room temperature; the solution was heated to approximately 60° and then was stirred for an additional one hour. The viscosity of the polymer was 0.78 and a DTA showed stability to 475° C. ($T_m$).

(B) *Terephthalamide.*—A 1.26 gm. (0.005 mole) portion of diamine A, 0.5 gm. of lithium chloride, and 9.5 ml. of DMAc were mixed and cooled to −30° C. Next 1.02 gms. (0.005 mol) of terephthaloyl chloride was added and the mixture stirred for one hour before the addition of 0.44 gm. of lithium hydroxide monohydrate. After an additional 0.5 gm. of lithium chloride and 9.5 ml. of DMAc were added, complete solution was effected and the mixture was then stirred for one and one-half hours. The polymer was precipitated into a mixture of 100 ml. of DMAc and 100 ml. of water and dried. The inherent viscosity of the polymer was 0.63 in DMAc with 5 percent lithium chloride. A DTA revealed that the polymer was stable to at least 500° C.

(C) *2,6-naphthalenediamide.*—B was repeated except that 1.26 gms. (0.005 mole) of 2,6-naphthalenedicarbonyl chloride was used. Inherent viscosity of the resulting polymer was 1.23 in DMAc containing 5 percent lithium chloride and 0.82 in concentrated sulfuric acid. A DTA revealed no decomposition or melting to 500° C. while TGA revealed no significant loss of weight to above 500° C.

(D) *4,4′-bibenzamide.*—A 0.63 gm. sample (.0025 mole) of diamine A, 0.25 gm. lithium chloride and 4.8 ml. DMAc were mixed together and then cooled to −30° C. Then 0.70 gm. (.0025 mole) of 4,4′-dibenzoyl chloride was added and the resulting mixture was stirred one hour at room temperature before the addition of 0.22 gm. lithium hydroxide monohydrate. An additional 5 ml. DMAc, 0.25 gm. of lithium chloride was added and the mixture stirred for one hour. The polymer was precipitated in a mixture of 50 ml. DMAc and 50 ml. water, soaked in water to remove salts and solvent, then dried. The inherent viscosity of the polymer was 0.68 in concentrated sulfuric acid. A DTA revealed that the polymer showed no melting or decomposition below 500° C.

(E) *4,4′-sulfonebibenzamide.*—A solution of 1.26 g. (0.005 mole) of diamine A in 8 ml. DMAc containing 5 percent dissolved lithium chloride was cooled to −30° C. and 1.71 g. (0.005 mole) 4,4′-sulfonebibenzoyl chloride was added. The solution was stirred 15 minutes at −30° C., 15 minutes at 0° C., and an hour at room temperature. The solution of polymer was neutralized with lithium hydroxide, then poured into water. The polymer was isolated, dried, redissolved in DMAc containing 5 percent dissolved lithium chloride, and cast into film of high thermal stability.

Example III

The following example illustrates the preparation of fiber from the polymer in Example II, Section A.

(A) A solution of 7.56 g. (0.03 mole) diamine A in 60 ml. DMAc containing 3 percent dissolved lithium chloride was cooled to −30° C. and 6.09 g. (0.03 mole) isophthaloyl chloride (redistilled and recrystallized from n-hexane) was added with stirring. The viscous mass was stirred for 30 minutes at −30° C., then allowed to warm to room temperature. An equivalent of anhydrous lithium hydroxide was used to neutralize the solution of polymer.

(B) Polymer of inherent viscosity 1.52 prepared in the manner above was dry spun from a dope containing 32.8 g. polymer dissolved in 170 ml. DMAc containing 5 percent dissolved lithium chloride. The fiber which was collected was soaked in water 24 hours, dried and drawn 2.5× at 310° C. and redrawn 1.4× at 403° C. Fiber properties were as follows:

D.p.f _____ 1.5.
Ten. _____ 6.7 g.p.d.
Elong. _____ 11.0%.
Ten.:                       3.8 g.p.d.
  At 200° C. _____ 2.5 g.p.d.
  At 300° C. _____ 0.64 g.p.d.
  At 400° C. _____ Fails to support 0.1 g. load
  At 535° C. _____ . per denier.
Dry heat shrinkage at 350° C. 3%.
Density _____ 1.368.

Other pertinent fiber data were: round cross-section; high order as indicated by X-ray, revealing streaked layer lines as found in nylon 66 or polyethyleneterephthalate; a melting point 495° C. (DTA); start of decomposition at 480° C. (TGA); excellent retention of strength after exposure to gamma radiation (2.87×10⁵ rads/hr.) at intervals of 1, 10 and 64 hours; excellent retention of strength after exposure in air at 300° C.; slight acid dyeability and fair disperse dyeability; excellent resistance to 4 N sodium hydroxide or 4 N sulfuric acid solutions at reflux and 16 N or 20 N solutions, respectively, at room temperature; excellent resistance to pure DMAc at room temperature.

(C) Polymer of inherent viscosity of only 0.7 was also successfully spun to fiber, but somewhat poorer physical properties were obtained:

D.p.f _____ 5.0.
Ten. _____ 4.6 g.p.d.
Elong. _____ 13%.
Ten.:                       2.4 g.p.d.
  At 200° C. _____ 1.3 g.p.d.
  At 300° C. _____ Fails to support 0.1 g. load
  At 490° C. _____ . per denier.

Example IV.—Preparation of polyamides of 3,5-bis(M-aminophenyl)-1,2,4-oxadiazole diamine B)

The polymers of this example have the following structure:

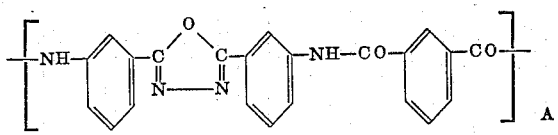

A

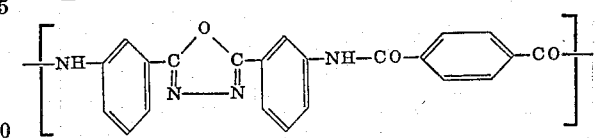

B

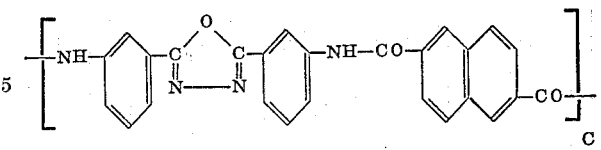

C

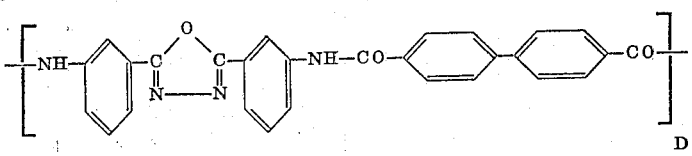

D (A) Isophthalamide.—A 2.52 gm. (0.01 mole) of diamine B was placed in a flask fitted with a stirrer and 10 ml. of dry DMAc was added. The solution of the diamine was cooled with an ice bath and 2.03 gms. (0.01 mole) of isophthaloyl chloride was added. A 5 ml. portion of DMAc was added to the thick paste obtained; next, the mixture was stirred at room temperature for two hours, then 0.9 gm. of lithium hydroxide monohydrate was added. The clear viscous solution obtained was stirred for one-half hour, then poured into rapidly stirred water in a blendor jar. The resulting polymer was soaked overnight and dried. A 3.6 gm. yield of polymer was obtained and a strong film of the polymer could be cast from a solution containing 16 percent polymer and 84 percent DMAc containing 5 percent dissolved lithium chloride. The inherent viscosity of the polymer was 0.88 in dimethyl acetamide containing 5 percent lithium chloride and 0.83 in concentrated sulfuric acid. The polymer was stable to at least 350° C. my means of DTA; loss of weight was negligible to 485° C. as determined by TGA.

(B) Terrephthalamide.—The example above was repeated with terephthaloyl chloride in place of isophthaloyl chloride and using diamine B. When 0.9 gm. of lithium hydroxide monohydrate was added, almost all the polymer was in solution. The addition of 10 ml. of benzene followed by distillation removed sufficient water so that a clear solution was obtained. Films were cast from the solution by evaporation of solvent in an oven. The inherent viscosity of the polymer was 0.78 in dimethylacetamide containing 5 percent lithium chloride. A DTA revealed that the polymer was stable to at least 460° C. ($T_m$).

(C) 2,6-naphthalenediamide.—This example was performed as in A except that 1.26 gms. (0.005 mole) of 2,6-naphthalenedicarbonyl chloride was used with 1.26 gms. (0.005 mole) of diamine B in solution of 9.5 ml. of dimethylacetamide and 0.5 gm. of lithium chloride. After the addition of 0.45 gm. of lithium hydroxide monohydrate, the polymer began to precipitate from the very viscous solution. The dry polymer, however, was soluble in concentrated sulfuric acid. A DTA revealed that the polymer was apparently stable to about 490° C. ($T_m$).

(D) 4,4'-bibenzamide.—The method of A was repeated except that the original reaction mixture was cooled to —30° C. before the addition of the stoichiometric weight of 4,4'-dibenzoyl chloride instead of isophthaloyl chloride. The mixture was stirred for one hour at room temperature then lithium hydroxide monohydrate was added. After the polymer was stirred an additional half hour, it was precipitated in a mixture of 100 ml. of water and 100 ml. of dimethylacetamide. The inherent viscosity of the dried polymer was 0.75 in dimethylacetamide containing 5 percent lithium chloride and 0.53 in concentrated sulfuric acid. A DTA revealed that the polymer was stable to 480° C. ($T_m$).

(E) The following illustrates the preparation of a polyamide-hydrazide, the isophthalamide of N,N'-bis(m-aminophenyl) hydrazide which can be converted by heat to the same composition described in A.

To a solution of 0.27 gm. (0.001 mole) of N,N'-bis(m-aminophenyl) hydrazide in 3 ml. of dimethylacetamide (DMAc was added 0.2 gm. (0.001 mole) of isophthaloyl chloride. The solution was stirred a few minutes, then poured into water. The polymer when dried was stable to 330° C., at which temperature it was converted to the polymer described in A.

(F) Polymer suitable for the preparation of excellent fibers was prepared by increasing the scale of the following experiment.

A solution of 2.52 g. (0.01 mole) diamine B in 15 ml. DMAc containing 5 percent dissolved lithium chloride was cooled to —30° C. Next, 2.03 g. (0.01 mole) terephthaloyl chloride was added and the solution obtained was stirred at 30° C. for 15 minutes. The viscous solution was stirred then at 0° C. for 1 hour and 45 minutes, then lithium hydroxide (0.88 g. monohydrate heated to 140° C.) and 15 ml. DMAc was added. The dried polymer was isolated and found to have an inherent viscosity of 2.2; clear, tough films were cast from solution.

Example V.—Polyamides of 3,5-bis(m-aminophenyl)-4-phenyl-1,2,4-triazole (diamine C)

Polymers of this example have the following structure:

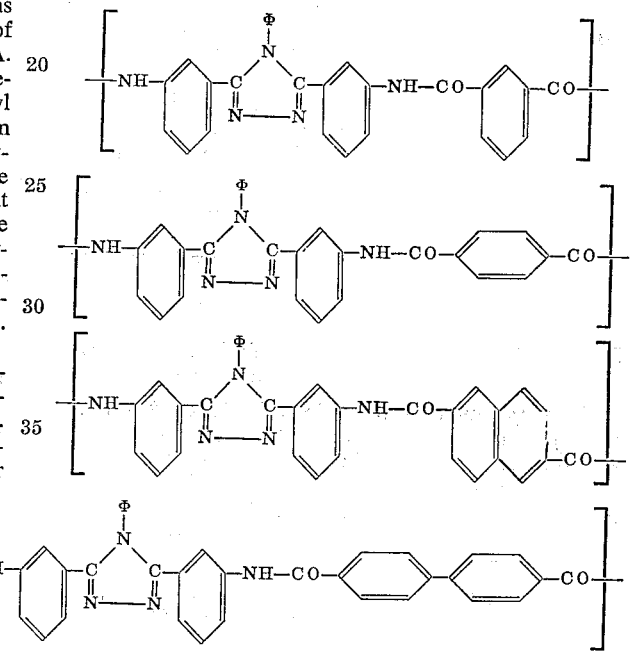

(A) Isophthalamide.—A 1.64 gm. (0.005 mole) portion of diamine C, melting point 335–337° C. and 20 ml. DMAc containing 5 percent dissolved lithium chloride were heated to 156° C., then cooled to room temperature. Next, 1.02 gms. (0.005 mole) of isophthaloyl chloride was added. The solution of polymer was stirred one hour, then 0.44 gm. lithium hydroxide monohydrate was added and the solution stirred one-half hour at which time polymerization was complete. The polymer was precipitated in 200 ml. of water, filtered, soaked in water to remove salts and dried. The inherent viscosity of the polymer was 0.39. The melting point of the polymer ($T_m$) was above 400° C.

(B) Terephthalamide.—A 0.64 gm. (0.005 mole) portion of diamine C melting point 329–33° C., 10 ml. DMAc containing 5 percent dissolved lithium chloride were stirred five minutes at room temperature, then cooled to —30° C. Next, 1.02 gms. (0.005 mole) of terephthaloyl chloride was added and the contents of the flask were allowed to warm to room temperature. After one hour 0.44 gm of lithium hydroxide monohydrate was added to the mixture and after another hour the solution was poured into a mixture of 100 ml. of DMAc. The resulting polymer was soaked in water to remove salts and dried. A film was obtained from a solution of polymer in DMAc containing 5 percent dissolved lithium chloride. The inherent viscosity of the polymer was 0.32 in DMAc containing 5 percent lithium chloride and 0.26 in concentrated sulfuric acid. A DTA of the polymer indicated that the glass transition temperature ($T_g$) of the polymer was 350° C. and the melting temperature of the polymer ($T_m$) was 445° C.

(C) *2,6-naphthalenediamide.*—The procedure of part A of this example was repeated except that 1.2 gms (0.005 mole) of 2,6-naphthalene dicarbonyl chloride was used. A good film was prepared from a solution of the polymer in DMAc containing 5 percent lithium chloride. The film had a few opaque areas in it. The inherent viscosity of the polymer was 0.5 in DMAc containing 5 percent dissolved lithium chloride and 0.41 in concentrated sulfuric acid. A DTA indicated a decomposition point in excess of 450° C. while TGA indicated resistance to loss of weight to 500° C.

(D) *4,4′-bibenzamide.*—The procedure of part A of this example was repeated using stoichiometric amounts of diamine C and 4,4′-bibenzoyl chloride. The dried polymer had an inherent viscosity of 0.39 in concentrated sulfuric acid. DTA indicated that the $T_c$ of the polymer was 335° C. while $T_m$ was 455° C.

The preparation described in Ser. No. 296,395 by Preston, was used to prepare 12.4 g. of 2,5-bis(m-carboxyphenyl)-1,3,4-oxadiazole which was refluxed 8 hours with 300 ml. thionyl chloride. The thionyl chloride was stripped off and the residual diacid chloride was recrystallized from 100 ml. dry toluene. Thus, 9.3 g. M.P. 173–175° C., was obtained.

Example VII

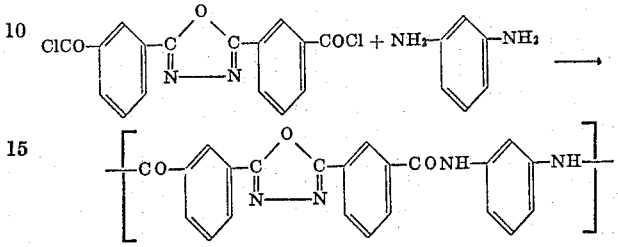

Example VIII

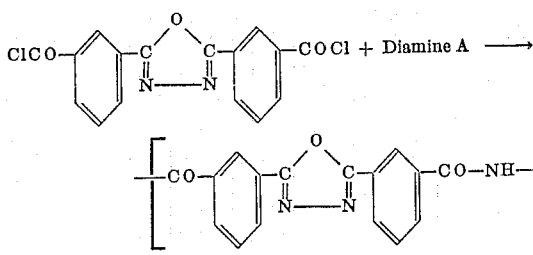

Example VI.—Preparation of acid chloride of 2,5-bis(m-carboxyphenyl)-1,3,4-oxadiazole The preparation of the acid chloride of 2,5-bis(m-carboxyphenyl)-1,3,4-oxadiazole (I) may be accomplished according to the following equations:

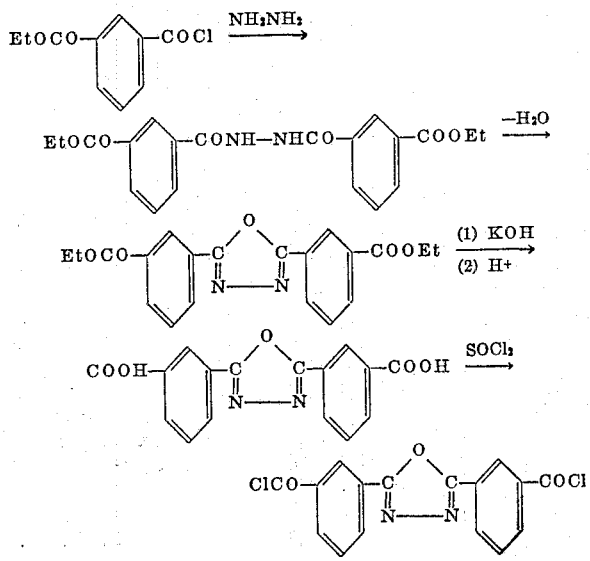

A solution of 0.54 g. (0.005 mole) m-phenylenediamine in 6 ml. DMAc containing 5 percent dissolved lithium chloride was cooled to −30° C. and 1.74 g. (0.005 mole) of the diacid chloride of 2,5-bis(m-carboxyphenyl)-1,3,4-oxadiazole (disclosed in copending application S.N. 296,395 by Preston) was added. The mixture was stirred at −30° C. for 15 minutes, then was allowed to warm to 0° C. The solution was stirred at 0° C. for 15 minutes, then was stirred at room temperature for three hours. The neutralized solution was cast into film. The dried polymer appeared to soften slightly at ca. 300° C., but $T_m$ was in excess of 470° C.

A solution of 1.26 g. (0.005 mole) diamine A, Example II, in 12 ml. DMAc containing 5 percent dissolved lithium chloride was cooled to −30° C. Next, 1.74 g. (0.005 mole) of the diacid chloride of 2,5-bis(m-carboxyphenyl)-1,3,4-oxadiazole was added and the solution was stirred 15 minutes at −30° C. The solution was allowed to warm to 0° C. and stirred at 0° C. for 15 minutes. The solution was allowed to warm to room temperature and was stirred for three hours before it was neutralized with lithium hydroxide. A light yellow film was obtained from the above solution. $T_m$ of the dried polymer was in excess of 470° C.

Example IX

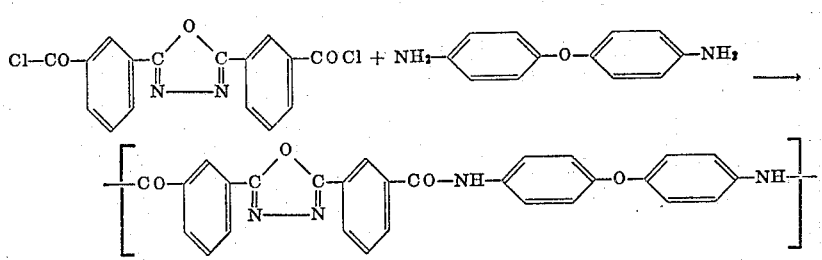

A solution of 0.6 g. (0.003 mole) p,p'-oxydianiline in 5 ml. DMAc containing 5% dissolved lithium chloride was cooled to −30° C. and 1.05 g. (0.003 mole) of the diacid chloride of 2,5-bis(m-carboxyphenyl)-1,3,4-oxadiazole was added. The solution was stirred at −30° C. for 15 minutes, allowed to warm to 0° C., then stirred for 15 minutes, and then allowed to warm to room temperature. After the polymer was precipitated, washed and dried, 1.2 g. of thermally stable material was obtained.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. An amide-heterocyclic polymer composed of regularly recurring structural units of the formula

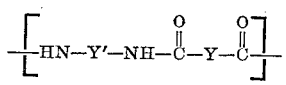

wherein Y' and Y are selected from the group consisting of Ar and Ar-X-Ar, wherein Ar is a divalent hydrocarbon aromatic radical oriented other than ortho, X is a symmetrical heterocyclic 5 member ring radical containing from one to three hetero elements selected from As, N, O, P, S or Se, wherein all occurrences of X must be the same in each recurring structural unit, and wherein at least one Ar-X-Ar radical must be present in the recurring structural unit, said polymer having at least one plane of symmetry in each recurring structural unit.

2. An amide-heterocyclic poylmer composed or regularly recurring structural units of the formula

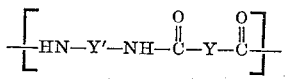

wherein Y' and Y are selected from the group consisting of Ar and Ar-X-Ar, wherein Ar is a divalent hydrocarbon aromatic radical oriented other than ortho, X is a symmetrical heterocyclic 5 member ring radical containing from one to three hetero elements selected from N, O or S, wherein all occurrences of X must be the same in each recurring structural unit, and wherein at least one Ar-X-Ar radical must be present in the recurring structural unit, said polymer having at least one plane of symmetry in each recurring structural unit.

3. A fiber-forming amide-heterocyclic polymer composed of regularly recurring structural units of the formula

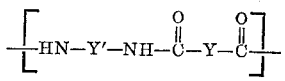

wherein Y' and Y are selected from the group consisting of Ar and Ar-X-Ar, wherein Ar is a divalent hydrocarbon aromatic radical oriented other than ortho, X is a symmetrical heterocyclic 5 member ring radical containing from one to three hetero elements selected from N, O or S, wherein all occurrences of X must be the same in each recurring structural unit, and wherein at least one Ar-X-Ar radical must be present in the recurring structural unit, said polymer having at least one plane of symmetry in each recurring structural unit.

4. An amide-heterocyclic polymer composed of regularly recurring structural units of the formula

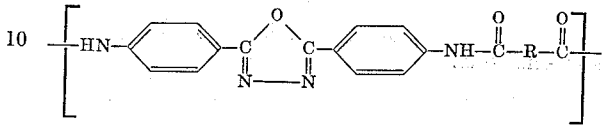

wherein —R— is a divalent hydrocarbon aromatic radical oriented other than ortho.

5. An amide-heterocyclic polymer composed of regularly recurring structural units of the formula

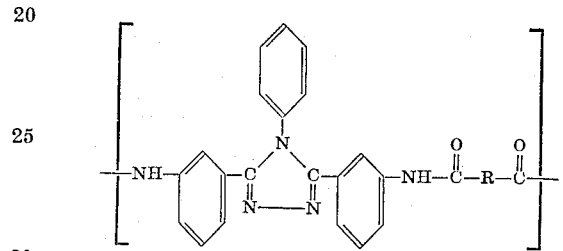

wherein —R— is a divalent hydrocarbon aromatic radical oriented other than ortho.

6. An amide-heterocyclic polymer composed of regularly recurring structural units of the formula

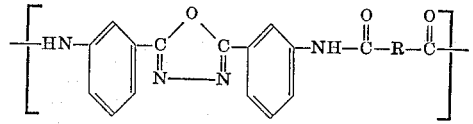

wherein —R— is a divalent hydrocarbon aromatic radical oriented other than ortho.

7. An amide-heterocyclic polymer composed of regularly recurring structural units of the formula

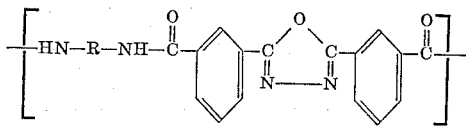

wherein —R— is a divalent hydrocarbon aromatic radical and wherein all aromatic rings are oriented other than ortho.

8. The polymer of claim 4 wherein R is p-phenylene.
9. The polymer of claim 4 wherein R is 2,6-naphthylene.
10. The polymer of claim 5 wherein R is m-phenylene.
11. The polymer of claim 5 wherein R is p-phenylene.
12. The polymer of claim 5 wherein R is 4,4'-biphenylene.
13. The polymer of claim 6 wherein R is p-phenylene.
14. The polymer of claim 6 wherein R is 2,6-naphthylene.
15. An amide-heterocyclic polymer composed of regularly recurring structural units of the formula

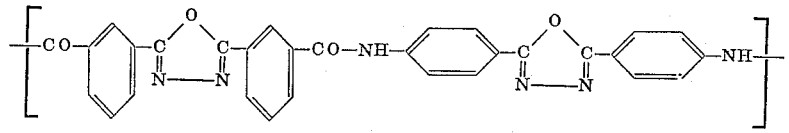

16. An amide-heterocyclic polymer composed of regularly recurring structural units of the formula
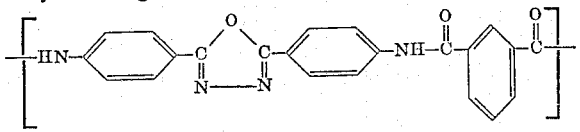
17. The polymer of claim 1 in the form of a fiber.
18. The polymer of claim 1 in the form of a self-supporting film.
References Cited
UNITED STATES PATENTS
3,049,518  8/1962  Stephens _____ 260—78
3,179,635  4/1965  Frost et al. _____ 260—78
WILLIAM H. SHORT, *Primary Examiner.*
H. D. ANDERSON, *Assistant Examiner.*